July 5, 1949.　　　　　H. M. ZENOR　　　　　2,474,883
AUTOMATIC ROTOR BALANCING APPARATUS
Filed Sept. 20, 1945　　　　　　　　　　　　5 Sheets-Sheet 1

INVENTOR
HUGHES M. ZENOR
BY
Herbert H. Thompson
his ATTORNEY.

July 5, 1949.　　　　H. M. ZENOR　　　　2,474,883
AUTOMATIC ROTOR BALANCING APPARATUS
Filed Sept. 20, 1945　　　　5 Sheets-Sheet 2

INVENTOR
HUGHES M. ZENOR
BY
his ATTORNEY.

July 5, 1949.  H. M. ZENOR  2,474,883
AUTOMATIC ROTOR BALANCING APPARATUS
Filed Sept. 20, 1945  5 Sheets-Sheet 3
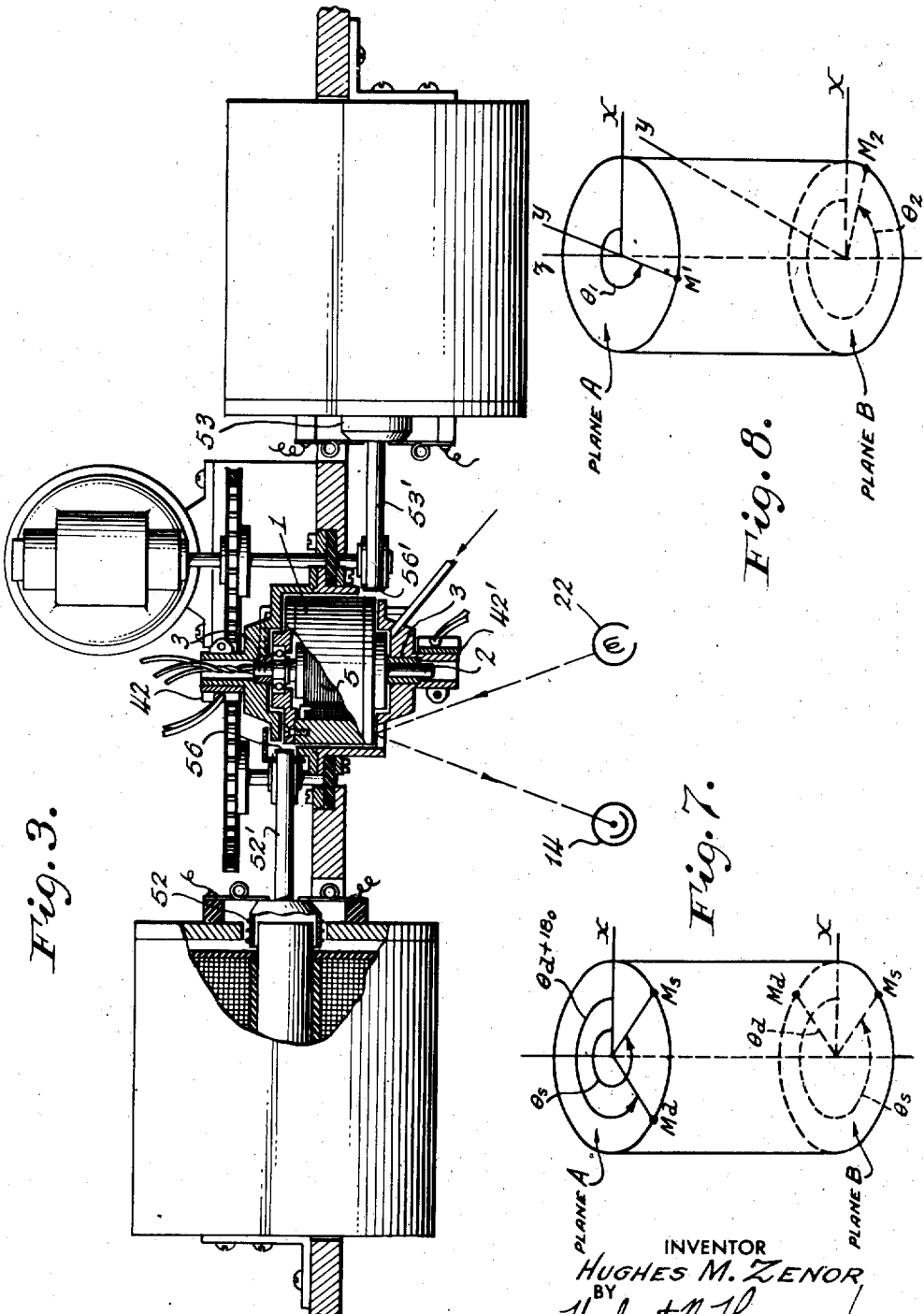

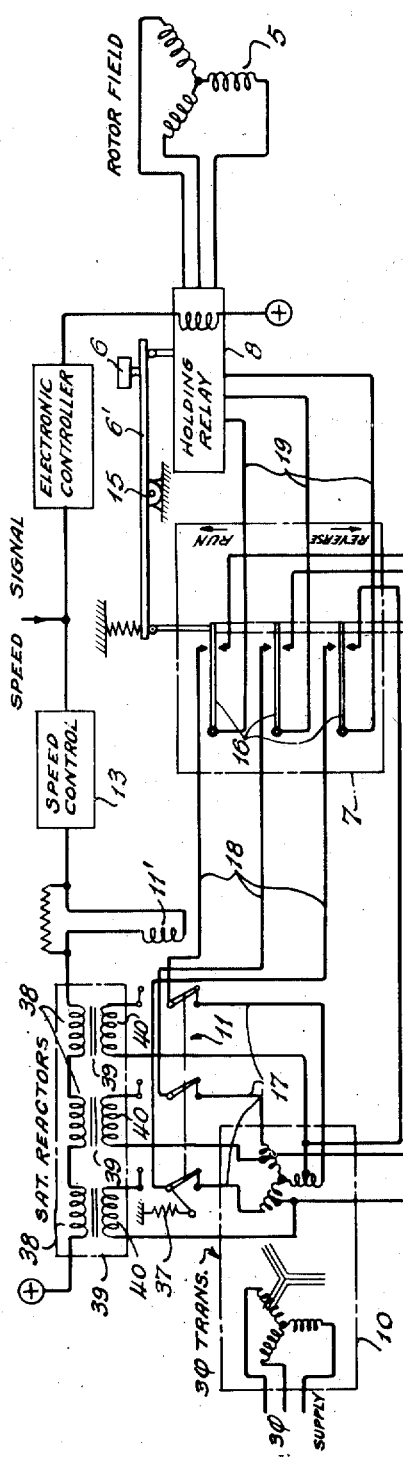

July 5, 1949.　　　　　H. M. ZENOR　　　　　2,474,883
AUTOMATIC ROTOR BALANCING APPARATUS
Filed Sept. 20, 1945　　　　　　　　　　　　　　5 Sheets-Sheet 5

INVENTOR
HUGHES M. ZENOR
BY
ATTORNEY.

Patented July 5, 1949

2,474,883

UNITED STATES PATENT OFFICE 2,474,883

AUTOMATIC ROTOR BALANCING APPARATUS

Hughes M. Zenor, Kittredge, Colo., assignor to The Sperry Corporation, a corporation of Delaware Application September 20, 1945, Serial No. 617,507

7 Claims. (Cl. 51—154)

This invention relates generally to the balancing of rotors, and the invention has reference more particularly to automatic rotor balancing apparatus for automatically static-dynamically balancing gyroscope rotors, flywheels, etc., while the latter are actually rotating.

In Patent No. 2,243,457 there is disclosed a novel balancing apparatus wherein indication is given of an unbalanced condition and the location of such unbalance is indicated. The rotor is then removed from the machine and the material removed to bring about a balanced condition, the rotor then being re-inserted into the machine and again tested.

In the present machine the rotor is once inserted and stays in the machine, and the material is automatically removed from the rotor while the same is in the machine, until a balanced condition is reached. The principles of the present invention are also applicable to manually operated balancing machines as well as to automatic balancing.

The principal object of the present invention is to provide a novel automatic rotor balancing system wherein a rotor is inserted into the apparatus and is automatically tested for unbalance and the material is removed automatically from the rotor to balance the same, whereupon the rotor automatically ceases its rotation and can be removed in a fully balanced condition.

Another object of the present invention lies in the provision of novel balancing apparatus and method wherein means is provided for producing signal voltages proportional to the amount of unbalance at a frequency predetermined by the rotor speed, means being provided for receiving such voltages and for determining whether to remove static or dynamic unbalance by reversing the polarity of at least a portion of the signal voltages, further means being provided for automatically removing material from the rotor at the proper position or positions to eliminate both static and dynamic unbalance thereof.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Other objects and advantages of this invention will become apparent as the description proceeds.

The terms "static unbalance" and "dynamic unbalance" are used in this specification in the same sense as that defined by J. P. Den Hartog in his book on "Mechanical Vibrations," pages 276 and 277. Thus, static unbalance is that unbalance which can be removed by placing the shaft of the rotor to be balanced on parallel knife edges and removing and adding weights until there is no tendency for the rotor to turn, regardless of its angular position. Dynamic unbalance is defined as that unbalance which cannot be removed by a static test. The magnitude and angular position of the dynamic unbalance can be determined only by rotating the rotor.

In carrying out the method of this invention, metal is removed from any two predetermined planes, such as the upper and lower end surfaces of the rotor to be balanced, though any planes adapted to be operated upon by standard balancing machines are suitable. To correct for static out of balance, equal quantities of metal are removed from each of the selected planes and at the same angular displacement from any selected axis. Thus, as shown in Fig. 7, equal quantities of metal $M_s$ are removed from each of the planes and at the same angular displacement $\theta_s$ from the axes $x$ at the top and bottom of the rotor extending at right angles to the rotor axes. To correct for dynamic out of balance, equal quantities of metal $M_d$ are removed from each of the planes, but at angular displacements differing by 180°, i. e. at diametrically opposite points, as shown in Fig. 7. Thus, the rotor is balanced dynamically and statically, or vice versa, by cutting metal in each case from both ends of the rotor.

The underlying theory of balancing is based on the fact that, assuming a fixed rotor speed, the rotating deflection of the rotor shaft, rotor casing, etc., has a fixed phase relation to the disturbing force of weight, the deflection being apparent as vibration. The motion resulting at either end of the rotor from unbalance of the rotor is approximately circular in a plane perpendicular to the rotor shaft. Thus, a particle on an end of the rotor axis moves in a circular path and has a definite phase or angular relation to the unbalanced weight on the rotor so that should the unbalance of the rotor be advanced by a certain angle, the particle on the rotor axis will be correspondingly advanced by the same angle in its circular path.

The movements of the particles on the two ends of the rotor axis do not necessarily have the same magnitude or angle. If the rotor is dynamically balanced and statically unbalanced, the particles on both ends of the rotor will move in the same circular pattern, with the same amplitude, and with the same angle. If the rotor is statically balanced and dynamically unbalanced, the particles on both ends of the rotor axis will move in circular patterns of the same magnitude but 180° difference in angle. Thus, if pick-offs of equal sensitivity are placed on each end of the rotor on the axis of rotation and their signals are added, the vibration from both ends due to static unbalance will be in phase, and the signal output will be twice that of each pick-off. If the unbalance is dynamic, the signal vibration of the two pick-offs will be 180° out of phase, cancelling each other, and giving no signal. Therefore, for this condition, only the static unbalance is indicated, the signal being unaffected by the dynamic out of balance.

If the polarity of the voltage from one of the pick-offs is reversed (by interchanging the two leads to this pick-off) and their signals added, the total signal output will be zero for static unbalance, and twice the signal for each pick-off for the dynamic unbalance. Thus, by switching the polarity of one of the pick-offs, it is possible to determine the magnitude and the angle of both the static and the dynamic unbalance, which is sufficient information for the balancing of a rotor, making a convenient way of obtaining a signal for the automatic removal of metal for the automatic balancing of a rotor.

To correct for the static unbalance, equal amounts of metal will be removed from each of the balancing planes, from the same side of the rotor. To correct for the dynamic unbalance, equal amounts of metal will be removed from each of the balancing planes on diametrically opposite sides of the rotor.

A more comprehensive understanding of this static-dynamic method of balancing will be obtained from the following mathematical analysis:

Referring to Fig. 8, it can be assumed that any unbalanced rigid rotor can be balanced by removing metal at two positions on planes A and B suitably chosen. In the rigid rotor of Fig. 8, the mass $M_1$ is removed at angle $\theta_1$ in plane A, and mass $M_2$ is removed at angle $\theta_2$ in plane B. By proper choice of masses $M_d$ and $M_s$ and angles $\theta_d$ and $\theta_s$, the same effect can be obtained from the rotor.

Assuming that Fig. 7 is superimposed on Fig. 8, and that the planes A and B of each are the same, and that the radius $r$ is the same in both figures, we can then write the following four independent equations of the X and Y components of force of the masses, as $$M_d \cos(\theta_d + 180°) + M_s \cos\theta_s = M_1 \cos\theta_1$$

$$M_d \sin(\theta_d + 180°) + M_s \sin\theta_s = M_1 \sin\theta_1$$

$$M_d \cos\theta_d + M_s \cos\theta_s = M_2 \cos\theta_2$$

$$M_d \sin\theta_d + M_s \sin\theta_s = M_2 \sin\theta_2$$

Thus, if $M_1$, $M_2$, $\theta_1$ and $\theta_2$ are known, we can solve for $M_d$ $M_s$, $\theta_d$ and $\theta_s$; since we have four independent equations. Likewise, if we have $M_d$, $M_s$, $\theta_d$ and $\theta_s$, we can solve for $M_1$, $M_2$, $\theta_1$ and $\theta_2$. So, with static-dynamic balancing, we obtain the same balancing as with the usual two plane balancing.

According to the principles of the present invention, when the rotor is running at a proper balancing speed as determined by a speed con[trol] apparatus, signal voltages which are proporti[on]al to the amount of unbalance and having a f[re]quency determined by the rotor speed, are ger[er]ated in crystal pick-offs responsive to rela[tive] oscillation of the rotor spin axis. These sig[nal] voltages are fed into a mixer stage of an ampli[fier] and the phasing of the signal voltages is de[ter]mined by the position of the relay 48 which is [op]erated at a predetermined frequency of appr[oxi]mately of the order of five seconds, if a balanc[e is] indicated before the fifth second is up, the pha[se] will be automatically reversed as determined [by] a suitable timing relay, for example. This mi[xer] stage determines whether to remove static or [dy]namic unbalance by reversing the polarity of [the] signal voltage of one pick-off; that is, if [the] relay is in dynamic cutting position and dyna[mic] unbalance is present, the polarity of the in[put] signal voltages and output signal voltages wil[l be] such that the two cutters used will operate si[]multaneously to remove material from the ro[tor] these cutters being located for mechanical c[on]venience 180° apart around the rotor, one be[ing] adjacent the top of the rotor and the other [ad]jacent the bottom of the rotor so that they [are] on diametrically opposite sides of the rotor. [If] the timing relay is still in dynamic position [and] only static unbalance is present, the voltage s[ig]nals reaching the preamplifier will be of op[po]site phase and therefore cancel each other o[ut] so that no operation of the cutters takes pl[ace.]

Before entering the mixer stage, both am[pli]tude and phase shifters (both electronic and m[e]chanical) are provided for the adjustment of [the] relationship of the pick-off signals to each ot[her] before they are mixed. From the mixer stage, [the] combined signals pass to suitable phase shift[ers] which make it possible to adjust the angle [at] which the cutters remove metal from the ro[tor] in relation to the signal. Once the phase sh[ift]ers are set, they need not be altered so long [as] the same type of rotor is being tested.

A meter is provided in the pre-amplifier to [in]dicate amplitude of unbalance, and an osci[llo]scope is employed to show phase relationship [be]tween the mechanical unbalance and vibrat[ion] signal, the oscilloscope indicating whether vib[ra]tion is due to unbalance, bearings, or ot[her] sources. From the pre-amplifier the signal g[oes] through a filter which is tuned to the freque[ncy] of the rotor speed and eliminates all signals [ex]cept those caused by out-of-balance vibrati[on.] The output of the filter is passed to a power a[m]plifier having automatic volume control to c[on]trol the amplitude of the cutting signal in or[der] to eliminate re-bound in the cutters. The pow[er] amplifier drives the cutters. The polarity of o[ne] of these cutters is reversed according to wheth[er] the rotor is being balanced dynamically or st[at]ically. The cutting agent used is emery clo[th] cut in narrow strips and fed continuously p[ast] the rotor so that unused emery is continuously [in] position for cutting, maintaining a uniform c[ut]ting rate. The emery cloth is forced into cont[act] with the rotor once each revolution, by means [of] a plunger attached to the voice coil of a dynam[ic] speaker which is driven by the power amplifi[er.] When the rotor has reached a predetermin[ed] state of balance, relay means is operated to r[e]verse the rotor to effect stoppage thereof in [a] short period of time. Granules of emery an[d] shavings from the rotor are continuously clean[ed] therefrom by the combination of a vacuum a[nd] air jets.

In the drawings,

Fig. 3 is an elevational view of the structure of Fig. 2 with parts broken away;

Fig. 4 is a wiring diagram of the rotor drive circuit;

Fig. 5 is a wiring diagram of the speed control circuit for determining the speed and direction of operation of the rotor;

Figs. 7 and 8 are schematic views illustrating the principles of operation.

Similar characters of reference are used in all of the above figures to indicate corresponding parts.

Figure 1:
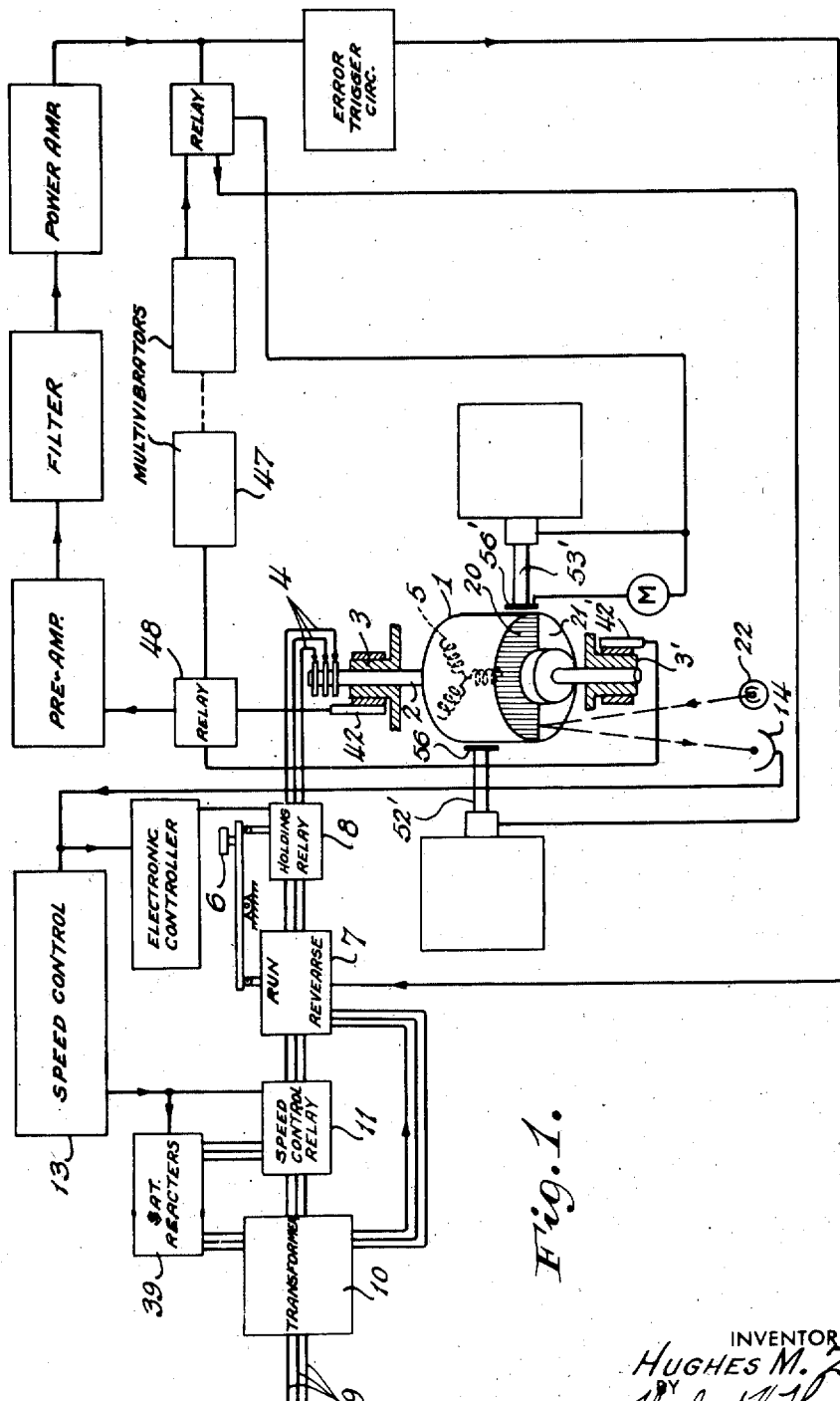
Fig. 1 is a schematic diagram of the novel automatic balancing apparatus of this invention.
Figure 2:
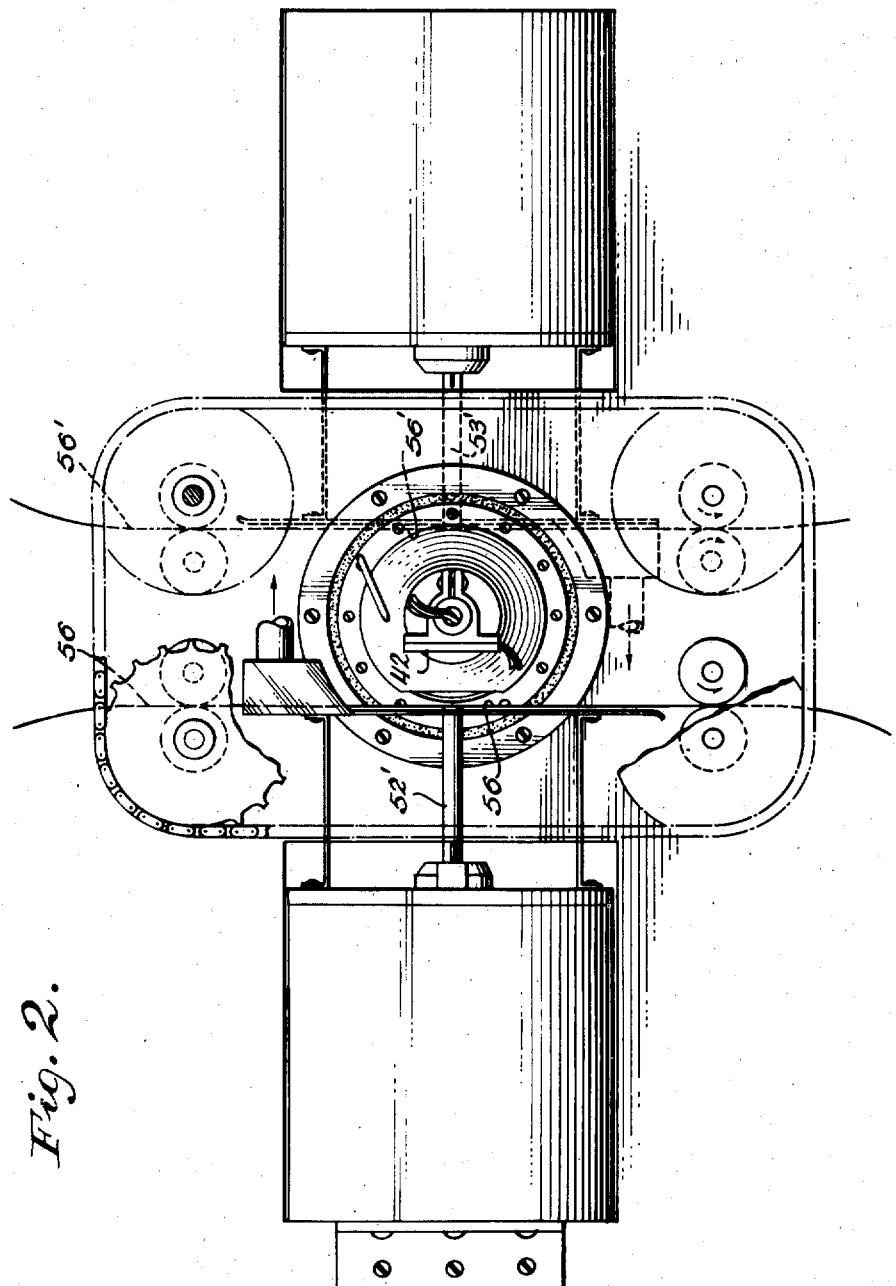
Fig. 2 is a plan view of a portion of the apparatus of Fig. 1 showing the rotor supporting means and the means for removing material therefrom.

The reference numeral 1 designates a rotor to be balanced, the said rotor being illustrated as a gyro rotor, but it is to be understood that any type of rotor or rotating means may be balanced by the apparatus and method of this invention.

The shaft 2 of rotor 1 is shown carried by bearings 3 and 3', from which the rotor may be removed at will in a manner similar to that disclosed in the above-mentioned patent. The rotor 1 is illustrated as electrically driven from three-phase leads 4, this rotor being provided with a rotor field winding 5 supplied from the leads 4. A starting button is shown at 6 for operating the running and reversing switch 7, a holding relay 8 being provided for holding the button 6 depressed and in rotor-operating position until the position of switch 7 is automatically reversed and the rotor has come to rest. The three-phase power supply leads 9 supply energy through a transformer 10 and through a speed control relay 11 to the running and reversing switch 7. The speed control relay 11 functions under the control of a speed signal derived from a speed control circuit 13, of which this relay is a part, to connect the rotor either across the speed control voltage or 150 volts A. C. supply, for example, the latter voltage being used for starting, in order that the rotor will reach balancing speed as rapidly as possible, and after balancing speed is approached, the speed signal supplied from speed control circuit 13 and derived from a photoelectric cell 14 responsive to the speed of the rotor 1 serves to control the relay 11 to connect the rotor with the speed control voltage, such as 105 volts in series with the low impedance coils 40 of the saturation reactors 39.

The starting push button 6 and associated parts are shown more in detail in Fig. 4. As will be seen from this figure, when the push button 6 is depressed, the lever 6' carrying the same turns about fulcrum 15 to actuate the running and reversing switch 7 to running position with contact blades 16 thereof contacting the upper stationary contacts shown, and completing circuits from the secondary of transformer 10 through leads 17, speed control relay 11, leads 18, switch blades 16, leads 19, holding relay 8, to the rotor field 5 of the rotor 1, thereby placing a high voltage upon this rotor field and effecting rapid acceleration of the rotor at the start. Note that the leads 17 are connected with the outer ends of the transformer secondary windings. Actually the push button 6 may be electrically connected for operating relay 7 for operating the latter.

The speed control circuit 13 is shown in greater detail in Fig. 5. In this figure the photocell 14 is shown illuminated by reflection from the end surface of the rotor 1, which end surface preferably has a dark area 20 and a light area 21. A light source 22 is arranged to have a pencil beam projected against the end of the rotor 1 for reflection to the photocell 14. Thus, the rotation of the rotor 1 produces an A. C. substantially square wave output from cell 14, which is supplied to the control grid of amplifier tube 23. Tube 23 has a screen grid connected with a delay circuit comprising a neon tube 24 and a condenser-potentiometer network 25, 26. When the rotor 1 initially accelerates from zero speed, the neon tube 24 fails to conduct the low voltage applied thereacross at this time, owing to the fact that a definite interval of time is required to charge the condenser 25. This time interval will depend upon the capacity of condenser 25 and also upon the setting of the potentiometer 26. After a short period, however, sufficient for the rotor to obtain a fairly high speed, the voltage across the potentiometer 26 will be sufficient to provide conduction to the neon tube 24, thereby biasing the screen grid of tube 23 to cause conduction of the tube and hence to supply a speed voltage to the connected circuits. The square wave output of the photoelectric cell 14 has many harmonics, and the delay circuit 25, 26 serves to prevent the harmonics from causing an undesired operation of the speed control relay until a desired high speed has been attained.

The output of the tube 23 is supplied to an intermediate amplifier tube 27 and from thence to a phase-sensitive amplifier 28, which also functions as a rectifier in that it provides a D. C. speed voltage output. The intermediate amplifier tube 27 is also supplied to a phase shifting circuit 30, the output of which is fed through tube 31 and transformer 32 in phase opposition to the grids of push-pull connected tubes 33, 33'. The phase shifting circuit 30 functions to shift the phase of the speed voltage through 180°, depending upon the frequency of the speed voltage, which in turn, of course, is dependent upon the speed of rotation of the rotor 1. Hence the voltage output of the phase sensitive amplifier 28 will be a D. C. voltage which will have a polarity of one sense or the other, depending upon whether the rotor speed exceeds or drops below a desired predetermined value.

The output of the phase sensitive amplifier passes through a low pass filter 34 and through an amplifier stage 35 to the actuating coil 11' of speed control relay 11. The contacts of relay 11 are normally biased by spring 37 to the high speed running position. The coil 11' is connected in series with high impedance coils 38 of saturable reactors 39. The saturable reactors comprise core members respectively associated with the high impedance coils 38 and with low impedance coils 40, which in turn are connected in the rotor field circuit by the operation of speed control relay 11. The high impedance coils 38 are shown connected to receive the D. C. speed voltage. These saturable reactors function automatically to maintain the rotor speed substantially constant and at predetermined balancing speed, once the relay 11' is operated to throw switch blades of relay 11 to the upper positions shown in Fig. 4. In other words, if the rotor speed should increase, the speed voltage will be of such polarity as to cause the increased resistance to the flow of current to the rotor field windings, thereby causing deceleration; and if the rotor speed should drop below such predetermined desired balancing speed, the reverse would occur.

Figure 6:
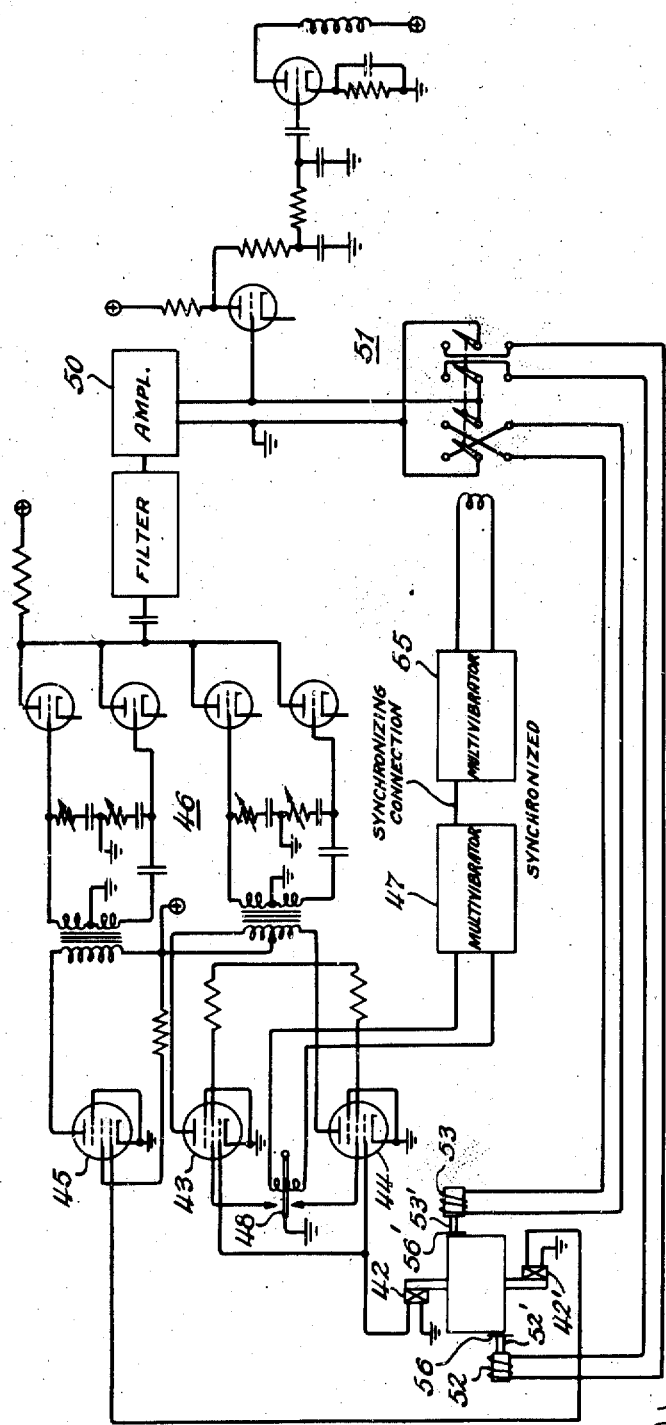
Fig. 6 is a wiring diagram illustrating the circuits and apparatus used for effecting the removal of material from the rotor.

The portion of the apparatus affecting the balancing of the rotor is shown in detail in Figs. 1 and 6, and comprises a pair of crystal pick-offs 42 and 42' which are connected with the bearings 3, 3'. The output of pick-off 42 is shown connected to the grids of amplifier tubes 43 and 44, where as the output of 42' is connected to the grid of amplifier tube 45. From the tubes 43, 44, and 45, these signals are passed to a phase shifting and mixer stage 46. When testing for static unbalance, the output of crystal pick-off 42 is connected to tube 43, which is then operating, whereas tube 44 is biased off, as will further appear.

When connected with tube 43, the output of pick-off 42 is connected in the same phase sense as the output of pick-off 42' connected to tube 45, i. e., at this time the phase outputs of tubes 45 and 43 will be similar. For dynamic testing the output of pick-off 42 is connected to tube 44, the output of which is in opposite phase sense to that of tube 45 receiving the signal from pick-off 42'. The means for determining the sense of the output of pick-off 42 constitutes the multivibrator 47 and the connected relay 48, the relay 48 being operated from multivibrator 47. The multivibrator 47 is further adjusted so that the relay 48 is operated at a predetermined frequency of approximately five seconds, so that it is in position five seconds for dynamic unbalance, then five seconds for static unbalance, whereupon the cycle repeats.

When the signals are in opposite phase sense, i. e., when tubes 45 and 44 are amplifying signals, the pick-offs are connected for a dynamic test through the action of multivibrator 47 and relay 48. The two signals thus combined in the mixer 46 are supplied preferably through an amplifier 50 to a relay 51, the output of which serves to control the operating coils 52, 53 of solenoids 52' and 53'. Amplifier 50 preferably incorporates an automatic volume control. The switch arms of relay 51 are controlled by the output of multivibrator 55, which multivibrator is preferably synchronized in its operation with the multivibrator 47 by the synchronizing connection shown, whereby when undergoing a dynamic test, for example, the plunger of the solenoids 52', 53' will operate simultaneously, and when undergoing a static test, these plungers will operate 180° out of phase.

Thus, when the signal voltages from the pick-offs are supplied out of phase to the amplifier 50, the output of the amplifier will be connected through relay 51 to cause the plungers to press against the work simultaneously on opposite sides of the rotor to correct for dynamic unbalance. When the signals are supplied in phase relation, the solenoids are connected through relay 51 to the output of amplifier 50 so that they will operate 180° out of phase, or approach the work on the same side of the rotor. The solenoids 52' and 53' press against cutting strips 56 and 56', which may be of emery cloth, for example, and which are continuously moved gradually past the ends of the solenoid plungers 52' and 53'.

When the multivibrators 47 have completed two cycles without indicating an error (out of balance) the error trigger circuit operates the relay 7, connecting the contacts 16 to the lower terminals connecting the rotor to the transformer 10, but with the polarity of one of the phases reversed so that the rotor 1 is rapidly stopped. When the rotor ceases to rotate, the electronic controller releases the holding relay 8 and the balanced rotor is ready to be removed from the automatic balancing machine.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Automatic rotor balancing apparatus comprising means for receiving and supporting a rotor, speed control means for automatically bringing the rotor up to a predetermined speed, electric pick-off means for automatically testing the rotor for unbalance and for producing voltage signals responsive to any unbalance, electric circuit means responsive to said voltage signals, and cutter members controlled from said electronic circuit means for automatically removing metal from two spaced selected planes of the rotor to effect balancing the same.

2. In automatic rotor balancing apparatus for balancing rotors, means for receiving and supporting a rotor, means for bringing the rotor up to a desired predetermined speed, means for producing alternating electromotive forces responsive to unbalance of the rotor, means utilizing said electromotive forces to detect static and dynamic unbalance of the rotor, and cutting means positioned on opposite sides of the rotor and responsive to such unbalance for automatically removing material from the rotor to balance the same.

3. Apparatus of the character described for automatically testing rotors for unbalance, comprising means for supporting a rotor to be tested, pick-off means for producing signal voltages proportional to the amount of unbalance of the rotor at a frequency determined by the rotor speed, means for receiving said signal voltages and for determining whether to remove static or dynamic unbalance by reversing the polarity of at least a portion of said voltages, and cutter means controlled from said last-named means for automatically removing material from the rotor at the proper position or positions to eliminate both static and dynamic unbalance thereof.

4. Automatic balancing apparatus for rotors comprising means for supporting a rotor for balancing, speed control apparatus for automatically bringing the rotor up to a desired running speed, pick-off means connecting with the rotor for producing signal voltages proportional to the amount of unbalance, said voltages having their frequency determined by the rotor speed, an amplifier and a connected mixer for receiving said signal voltages, relay means for phasing said voltages at a predetermined frequency whereby said mixer determines the existence of static or dynamic unbalance, and servo means controlled from said mixer and comprising cutters operable simultaneously during dynamic testing to cut material from the rotor at opposite sides thereof to effect dynamic balance, said cutters being operable in out-of-phase relation during static testing to remove material from the same side of the rotor for effecting static balancing.

5. Automatic rotor balancing apparatus comprising upper and lower bearings for receiving the upper and lower ends of a rotor shaft, speed control means for quickly bringing the rotor up to a desired predetermined running speed, crystal pick-off means connected with said bearings for producing signal voltages responsive to rotor unbalance, amplifier means supplied from said pick-off means, relay means for connecting the outputs of certain of said amplifiers in similar phase relation and alternately in opposite phase relation for dynamic and static unbalance, mixer means for receiving outputs of said amplifiers and servo mechanism controlled from the output of said mixer means, said servo mechanism comprising means for automatically cutting material from the rotor to eliminate both static and dynamic unbalance thereof.

6. Automatic rotor balancing apparatus as defined in claim 5 wherein said cutter means comprises solenoids located on opposite sides of the rotor and having plungers for pressing the emery cloth against upper and lower portions of the rotor, said plungers operating simultaneously during the dynamic unbalance and 180° in out-of-phase relation to correct for static unbalance.

7. In automatic rotor balancing apparatus for balancing rotors, means for receiving and supporting a rotor, means for bringing the rotor up to a desired predetermined speed, means for producing alternating electromotive forces responsive to unbalance of the rotor, means utilizing said electromotive forces to detect static and dynamic unbalance of the rotor, said last-named means comprising amplifiers and relay means for connecting the outputs of certain of said amplifiers in like phase relation for dynamic unbalance and for connecting the outputs of certain of said amplifiers in unlike phase relation for static unbalance, and cutting means responsive to such unbalance for automatically removing material from the rotor to balance the same.

HUGHES M. ZENOR.

REFERENCES CITED

The following references are of record in the file of this patent:

UNITED STATES PATENTS

| Number    | Name      | Date           |
|-----------|-----------|----------------|
| 1,544,521 | Sosa      | June 30, 1925  |
| 2,171,927 | Fuchs     | Sept. 5, 1939  |
| 2,243,379 | Johnson   | May 27, 1941   |
| 2,243,457 | Esval et al. | May 27, 1941 |
| 2,322,561 | Bevins    | June 22, 1943  |
| 2,327,606 | Saltz     | Aug. 24, 1943  |
| 2,327,607 | Saltz     | Aug. 24, 1943  |
| 2,327,608 | Saltz     | Aug. 24, 1943  |
| 2,327,609 | Saltz     | Aug. 24, 1943  |
| 2,331,733 | Senger    | Oct. 12, 1943  |
| 2,346,975 | Laboulais | Apr. 18, 1944  |

Certificate of Correction

Patent No. 2,474,883                                                           July 5, 1949

HUGHES M. ZENOR

It is hereby certified that error appears in the printed specification of the above numbered patent requiring correction as follows:

Column 8, line 23, for the word "electric" read *electronic*;

and that the said Letters Patent should be read with this correction therein that the same may conform to the record of the case in the Patent Office.

Signed and sealed this 16th day of May, A. D. 1950.

[SEAL]

THOMAS F. MURPHY,
*Assistant Commissioner of Patents.*